United States Patent
Desai et al.

(10) Patent No.: US 12,342,291 B1
(45) Date of Patent: Jun. 24, 2025

(54) CLOSED LOOP TRANSMIT POWER CONTROL

(71) Applicant: Cisco Technology, Inc., San Jose, CA (US)

(72) Inventors: Vishal Satyendra Desai, San Jose, CA (US); Pooya Monajemi, Irvine, CA (US)

(73) Assignee: Cisco Technology, Inc.

( * ) Notice: Subject to any disclaimer, the term of this patent is extended or adjusted under 35 U.S.C. 154(b) by 237 days.

(21) Appl. No.: 17/820,459

(22) Filed: Aug. 17, 2022

(51) Int. Cl.
*H04W 52/24* (2009.01)
*H04W 52/08* (2009.01)
*H04W 52/14* (2009.01)
*H04W 52/36* (2009.01)

(52) U.S. Cl.
CPC ......... *H04W 52/245* (2013.01); *H04W 52/08* (2013.01); *H04W 52/143* (2013.01); *H04W 52/367* (2013.01)

(58) Field of Classification Search
CPC . H04W 52/245; H04W 52/08; H04W 52/143; H04W 52/367
See application file for complete search history.

(56) References Cited

U.S. PATENT DOCUMENTS

| | | | |
|---|---|---|---|
| 9,591,588 B1* | 3/2017 | Lee | H04L 43/08 |
| 2009/0268671 A1 | 10/2009 | Cave et al. | |
| 2013/0028158 A1 | 1/2013 | Lee et al. | |
| 2017/0237480 A1 | 8/2017 | Xu et al. | |
| 2017/0324439 A1* | 11/2017 | Desai | H04B 1/48 |
| 2017/0325104 A1* | 11/2017 | Desai | H04W 16/10 |
| 2021/0345149 A1 | 11/2021 | Desai | |
| 2022/0256527 A1* | 8/2022 | Kulkarni | H04L 5/0032 |

FOREIGN PATENT DOCUMENTS

WO 2016123268 A1 8/2016

* cited by examiner

*Primary Examiner* — Nguyen T Vo
(74) *Attorney, Agent, or Firm* — Merchant & Gould P.C.

(57) ABSTRACT

A network of access points may be provided. Access points operating in a low power indoor (LPI) mode and access points operating in a standard power (SP or SPI) mode are identified. The access points operating in an SP or SPI mode are sorted by available frequencies and maximum power budget. For each access point in the network, a composite radio frequency (RF) density score is determined, wherein higher density scores correspond to a denser population of access points in the network. If the composite RF density score is above a determined level, the access point that supports frequencies below a threshold level and that have an effective isotropic radiated power (EiRP) above a determined level are determined as a seed candidate. At least one of the seed candidates is determined as a seed access point.

20 Claims, 10 Drawing Sheets

High 6E Station Density - Seed Preference by Freq

FIG. 4
High 6E Station Density - Seed Preference by Freq

Thetal = 2.5
SRind = 7
TPC6E Power List Recommendations:

| AP | Slot | Tx_Ideal | Tx_Current | Neighbors 1, 2, 3, Mean Over Lap | | | | Neighbors 1, 2, 3 RSSI | | | Neighbors 1, 2, 3 Dist (m) | | | Neighbors 1, 2, 3 TxPwr | | |
|---|---|---|---|---|---|---|---|---|---|---|---|---|---|---|---|---|
| SJC24-32A-AP11 | 4 | 8.0 | 23.0 | 59% | 12% | 0.0% | 23.8% | -44 | -49 | -53 | 5 | 14 | 21 | 2 | 2 | 2 |
| SJC24-32A-AP1 | 4 | 14.0 | 23.0 | 45% | 27% | 24.0% | 31.9% | -50 | -53 | -55 | 9 | 12 | 12 | 2 | 5 | 5 |
| SJC24-32A-AP39 | 4 | 11.0 | 23.0 | 39% | 13% | 0.0% | 17.5% | -44 | -50 | -53 | 9 | 13 | 30 | 2 | 2 | 2 |
| SJC24-32A-AP13 | 4 | 8.0 | 23.0 | 25% | 17% | 22.4% | 21.6% | -50 | -53 | -55 | 11 | 14 | 13 | 5 | 5 | 2 |
| SJC24-31A-AP28 | 4 | 11.0 | 23.0 | 46% | 6% | 17.8% | 23.4% | -47 | -58 | -59 | 9 | 15 | 13 | 2 | 2 | 5 |
| SJC24-31A-AP17 | 4 | 11.0 | 23.0 | 15% | 1% | 25.7% | 14.1% | -52 | -53 | -54 | 14 | 18 | 11 | 2 | 5 | 2 |
| SJC24-31A-AP21 | 4 | 11.0 | 23.0 | 16% | 39% | 1.2% | 18.9% | -50 | -51 | -54 | 13 | 9 | 17 | 2 | 2 | 5 |
| SJC24-31A-AP23 | 4 | 11.0 | 23.0 | 24% | 0% | 11.2% | 11.8% | -49 | -50 | -51 | 11 | 24 | 15 | 2 | 2 | 2 |
| SJC24-32A-AP10 | 4 | 8.0 | 23.0 | 26% | 18% | 9.6% | 17.7% | -44 | -46 | -47 | 12 | 13 | 14 | 5 | 5 | 5 |
| SJC24-31A-AP36 | 4 | 8.0 | 23.0 | 48% | 22% | 4.9% | 24.7% | -44 | -48 | -55 | 7 | 12 | 17 | 2 | 2 | 2 |
| SJC24-32A-AP4 | 4 | 11.0 | 23.0 | 36% | 46% | 1.0% | 27.6% | -51 | -51 | -52 | 10 | 8 | 18 | 5 | 5 | 5 |
| SJC24-31A-AP24 | 4 | 11.0 | 23.0 | 18% | 10% | 26.4% | 18.3% | -51 | -53 | -54 | 13 | 15 | 12 | 5 | 5 | 5 |
| SJC24-31A-AP25 | 4 | 11.0 | 23.0 | 54% | 13% | 1.7% | 22.8% | -50 | -57 | -58 | 7 | 15 | 18 | 5 | 5 | 5 |
| SJC24-31A-AP29 | 4 | 8.0 | 23.0 | 22% | 11% | 15.0% | 16.1% | -46 | -50 | -53 | 12 | 15 | 14 | 5 | 5 | 2 |

90th Percentile Mean Over Lap: 17%

CLOSED LOOP TRANSMIT POWER CONTROL

TECHNICAL FIELD

The present disclosure relates to power control, and more particularly to closed loop transmit power control.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A network of access points may be provided. Access points operating in a low power indoor (LPI) mode and access points operating in a standard power (SP or SPI) mode are identified. The access points operating in an SP or SPI mode are sorted by available frequencies and maximum power budget. For each access point in the network, a composite radio frequency (RF) density score is determined, wherein higher density scores correspond to a denser population of access points in the network. If the composite RF density score is above a determined level, the access point that supports frequencies below a threshold level and that have an effective isotropic radiated power (EiRP) above a determined level are determined as a seed candidate. At least one of the seed candidates is determined as a seed access point.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. While embodiments of the disclosure may be described, modifications, adaptations, and other implementations are possible. For example, substitutions, additions, or modifications may be made to the elements illustrated in the drawings, and the methods described herein may be modified by substituting, reordering, or adding or eliminating stages, step, or operations to the disclosed methods. Accordingly, the following detailed description does not limit the disclosure. Instead, the proper scope of the disclosure is defined by the appended claims.

In spring 2020, FCC (Federal Communications Commission) issued new report and order that approved 1200 MHz of new spectrum for Wi-Fi transmissions, in the 5.925 GHz to 7.125 GHz bands, which is known as the 6 GHz spectrum. Soon after, Canada followed suite, then the ETSI (European Telecommunication Standards Institute) allowed 500 MHz in the same frequency range. This vast spectrum creates unique opportunities for Wi-Fi vendors and overall tremendous increase in the Wi-Fi capacity and performance.

This new 6 GHz spectrum ensures minimal 802.11 overhead by supporting fast initial link setup (FILS), UBPR, and reverse and replace decoding for collision recovery (RNR) to reduce probe storm and beacon discovery time. It limits association for high efficiency WiLAN (HEW) stations and does not allow 802.11n and 802.11ac (Wave 1+Wave 2) clients to operate in this spectrum. From the radio frequency (RF) point of view, 6 GHz brings a unique set of challenges with a subset of the spectrum being regulated by automated frequency coordination (AFC) that governs whether a set of radios can operate at lower power (e.g., LPI: low power indoors) or operate at standard power (SP), which can support a higher effective isotropic radiated power (EiRP) of up to 36 dBm in certain regulatory domains.

Figure 1:
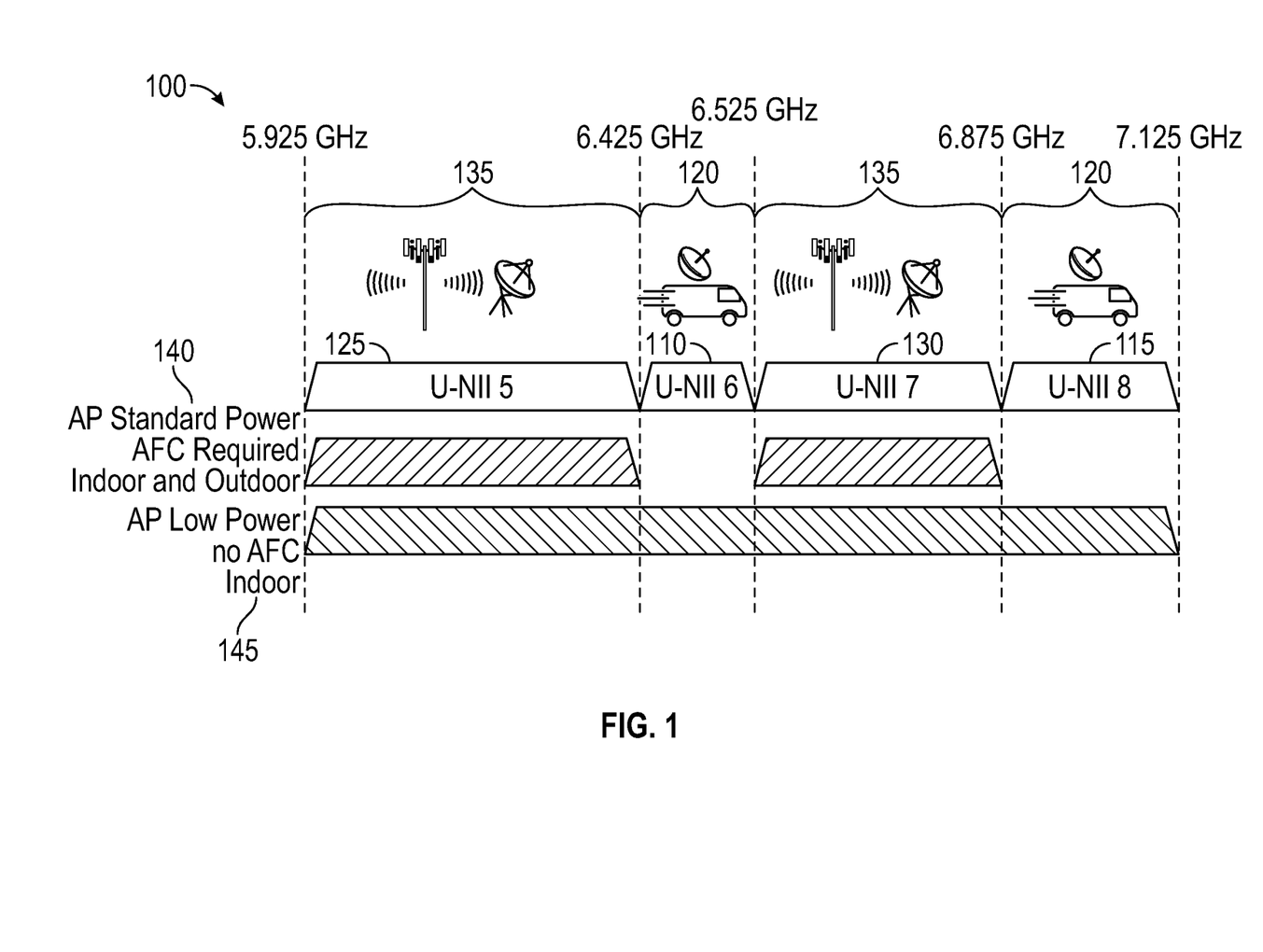
FIG. 1 illustrates permissible locations for power levels for a given frequency spectrums.

FIG. 1 is a chart 100 illustrating permissible locations for power levels for a given frequency spectrum. Referring to FIG. 1, in the United States, RF bands U-NII 6 and U-NII 8 110 and 115, respectively, are not allowed for outdoor Wi-Fi operations 120 because it is difficult to predict where mobile incumbents might be at any time. RF bands U-NII 5 and U-NII 7 125 and 130 are easier to manage, because the incumbents in these bands are fixed stations and are typically indoors 135. Wi-Fi still should not disrupt their operations. SP operations 140 are mandatory for all access points operating in outdoor environments 135 along with indoor access points that support external antennas. LPI 145 operations do not require AFC and can be used in any suitable location, including both indoor and outdoor locations 135 and 120, respectively.

An access point that wants to operate at standard power in the 6 GHz spectrum first needs to proactively verify that its transmissions at higher EiRPs do not create interference for all incumbents in the vicinity. This verification must be done each time the access point boots. The verification is then confirmed daily as a precaution against situations in which a new radio wave tower is installed nearby. This verification is achieved through a connection to an AFC system.

SP operations will maximize station performance, and the higher cell size of 6E Radios can further expand Wi-Fi coverage. However, because 6E radios are governed by AFC, daily changes in the max EiRP limit results in cascading affects and power fluctuations on the 6E radios at customer sites. Furthermore, collocated access points with LPI and SPI (or SP) capabilities trigger asymmetrical cell coverages in the bordering areas and results in roaming delays and worsens sticky client problems. Furthermore, for the radios that operate in LPI mode, operational bandwidth of that neighboring radio also will directly correlate to the amount of co-channel interference due to revised power spectral density (PSD) rules in the 6 GHz spectrum.

Figure 2:
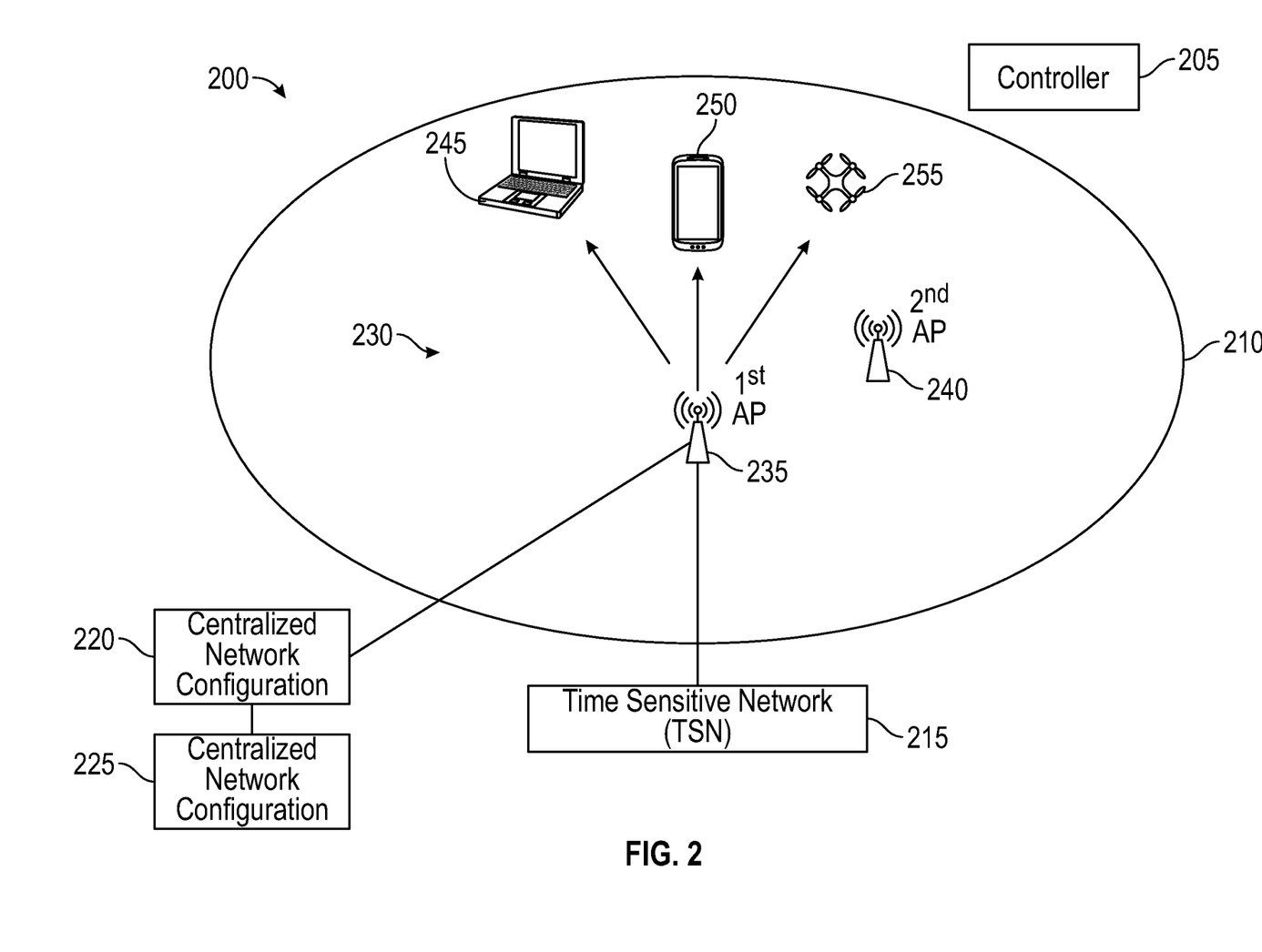
FIG. 2 is a block diagram of an operating environment for providing bi-directional gates for scheduling.

FIG. 2 shows an operating environment 200 for a network having a plurality of access points, at least some of which operate 6E radios. As shown in FIG. 1, operating environment 200 may comprise a controller 205, a coverage environment 210, a Time Sensitive Network (TSN) 215, a Centralized Network Configuration (CNC) server 220, and a Centralized User Configuration (CUC) 225 server. Coverage environment 210 may comprise, but is not limited to, a Wireless Local Area Network (WLAN) comprising a plurality of stations 230. The plurality of stations 230 may comprise a plurality of access points (APs) and a plurality of client devices. At any given time, any one of the plurality of stations 230 may comprise an Initiating Station (ISTA) or a Responding Station (RSTA). The plurality of APs may provide wireless network access (e.g., access to the WLAN) for the plurality of client devices. The plurality of APs may comprise a first AP 235 and a second AP 240. Each of the plurality of APs may be compatible with specification standards such as, but not limited to, the Institute of Electrical and Electronics Engineers (IEEE) 802.11 specification standard for example. Coverage environment 210 may comprise, but is not limited to, an outdoor wireless environment, such as a mesh (e.g., a Wi-Fi mesh). Embodiments of the disclosure may also apply to indoor wireless environments and non-mesh environments.

Additionally, the access points include radios to transmitting and receiving signals. The access point includes 6A radios that operating in the 6 GHz spectrum. At least some of the access points may be tri-band access point and operate 6E radios, 2.4 GHz radios that operate in the 2.4 GHz spectrum and 5 GHz radios that operate in the 5 GHz spectrum. As used herein the term "access point" may be used to refer to the 6E radio included within the access point. Additionally, the methods and system disclosed herein may be used for radios included in devices not included in an access point, and radios that are in devices other than access points.

Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device. In the example shown in FIG. 1, the plurality of client devices may comprise a first client device 245 (e.g., a laptop computer), a second client device 250 (e.g., a smart phone), and a third client device 255 (e.g., a drone).

Controller 205 may comprise a wireless local area network controller (WLC) and may provision and control the operating environment 200 (e.g., the WLAN). Controller 205 may allow the plurality of client devices to join the operating environment 200. In some embodiments of the disclosure, controller 205 may be implemented by a digital network architecture center (DNAC) controller (i.e., a software-defined network (SDN) controller) that may configure information for the operating environment 200 to provide bi-directional gates.

The elements of the operating environment 200 (e.g., controller 205, CNC server 220, CUC, 225 server, first AP 235, second AP 240, first client device 245, second client device 250, and third client device 255) may be practiced in hardware and/or in software (including firmware, resident software, micro-code, etc.) or in any other circuit or system. The elements of operating environment 200 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 200 also may be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 200 may be practiced in a computing device 800.

Figure 3:
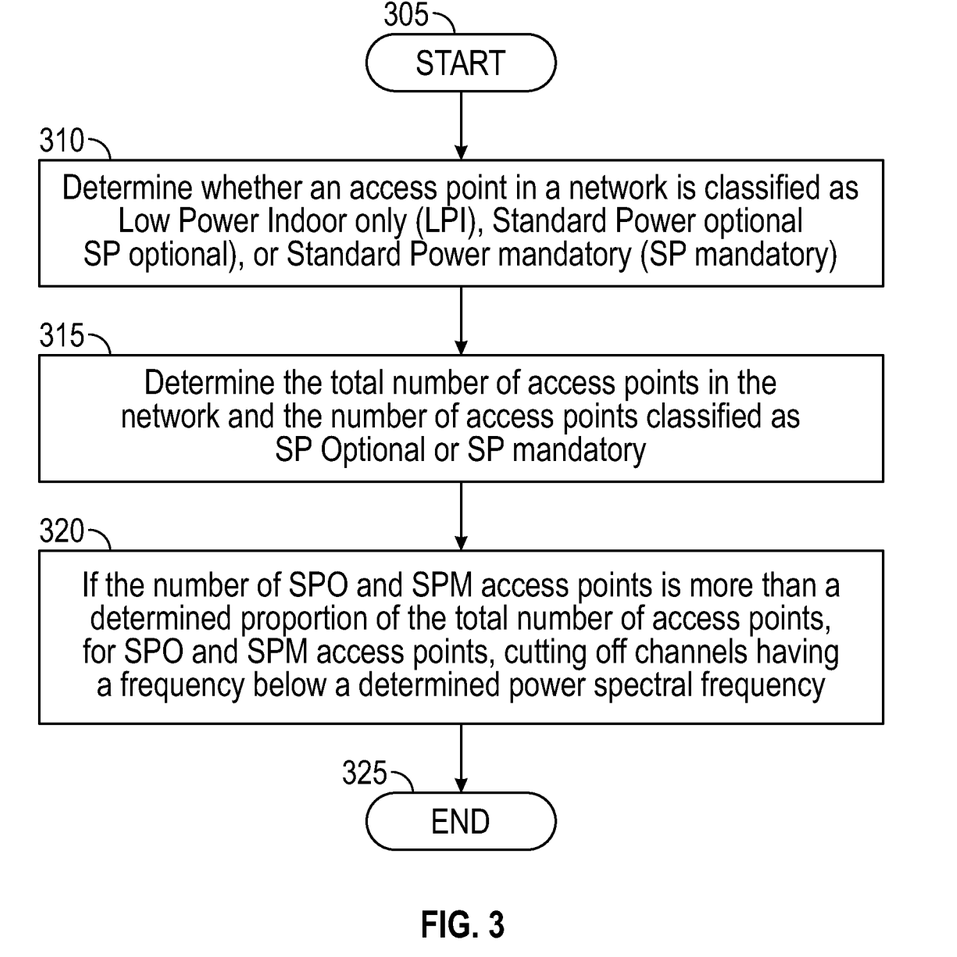
FIG. 3 is a flow chart for a process of closed loop power control.

FIG. 3 is a flow chart setting forth the general operations involved in a method 200 consistent with an embodiment of the disclosure for providing closed loop transmit power control. Steps or operations to implement the stages of method 200 will be described in more detail herein.

The method begins at operation 205. Access points operating in a low power indoor (LPI) mode and access points operating in a standard power (SP or SPI) mode are identified. Operation 210. Access points operating in an SP or SPI mode are sorted by available frequencies and maximum power budget. Operation 215. For each access point in the network, a composite radio frequency (RF) density score is determined, wherein higher density scores correspond to a denser population of access points in the network. Operation 220. If the composite RF density score is above a determined level, the access point that supports frequencies below a determined level and that has an effective isotropic radiated power (EiRP) above a determined level are designated as a seed candidate access point. Operation 225. At least one of the seed candidate access point is determined as a seed access point. Operation 230. The process ends at 235.

Traditional power control mechanisms for radios operating in the 2.4 GHz and 5 GHz spectrums were mainly contention driven. As the number of access points deployed per sq. ft. rapidly increases, the greater the risk of Wi-Fi co-channel interference from adjacent access points will drive down performance of the network.

Power management for radios operating in the 6 GHz spectrum postures a new set of challenges that are not applicable to earlier generations of radios. For example, with 1200 MHz of spectrum available in United States (500 MHz in ETSI) and soon available for other countries, co-channel contention is not the main concern in this spectrum. Radios operating in the 6 GHz spectrum mainly run into coverage-related concerns when a majority of the indoor access points are bound to operate in Low Power Indoors (LPI) mode. Typically, radios operating in the 5 GHz spectrum support 29 dBm-30 dBm EiRP on UNII-3 channels while radios operating in the 6 GHz spectrum are limited to an EiRP of 5 dBm/MHz, which equates to about 18 dBm for 20 MHz. Furthermore, like outdoor access points, all access points having an external antenna are mandated by Automated Frequency Control (AFC). AFC allows access points operating in the 6 GHz spectrum to operate at a Standard Power of about 23 dBm/MHz, which is about 36 dBm EiRP at 20 MHz. AFC requires candidate access points to report their geolocation and to enforce a revised set of frequencies with a power budget every 24 hours. Therefore, power control mechanisms for radios operating in the 6 GHz spectrum are more susceptible to frequent power updates than their predecessors.

There are at least two methods that can be used to adapt the performance of access points between coverage and capacity based on a performance profile for varying RF densities. These methods ensure stations benefit from increased EiRP over high bandwidths, reduce power updates in the network by proactively evaluating AFC impact, minimize co-channel contention, and reduce the number of sticky clients in the network.

The first method evaluates access points having 6E radios in a network to determine which ones are candidates to operate as a seed access point. A purpose of determining seed candidate selection is to minimize the number of power updates in the network by selecting a seed access point based on the 6E radio capability and whether a network has a high station density or has sparse coverage mode. After candidate seed access points are determined, the second method evaluates cell overlap between the 6E radio's immediate neighbors and non-immediate neighbors that operate as an overlapping broadcast switching system (OBSS) for the radio under test.

The process of selecting access points that are candidates to be a seed access points includes identifying radios in the network as being LPI-only access points from SP and SPI Access Points, which enables biasing the selected seed access points as describe herein. SP and SPI radios can operate at significantly higher power compared to LPI radios. However, based on the density of the incumbents around a 6E radios, an SP radio may be eligible to operate at a smaller portion of the available frequencies.

The SPI and SP radios are then sorted by the set of available frequencies at which they operate, which is determined from the AFC system. The candidate Access points are sorted by ascending order, from the lowest frequency to the highest frequency. The candidate access points are also sorted in descending order by maximum EiRP budget allowed on these allowed frequencies. The maximum budget is provided by the AFC system. A composite RF density score is calculated for the neighborhood of access points based on the station density around each access point and also based on radio neighborhood information such as the EiRP for each radio in the neighborhood and location of the access points. A lower composite RF score corresponds to a sparse deployment of access points and a higher score corresponds to a denser deployment of access points.

Figure 4:
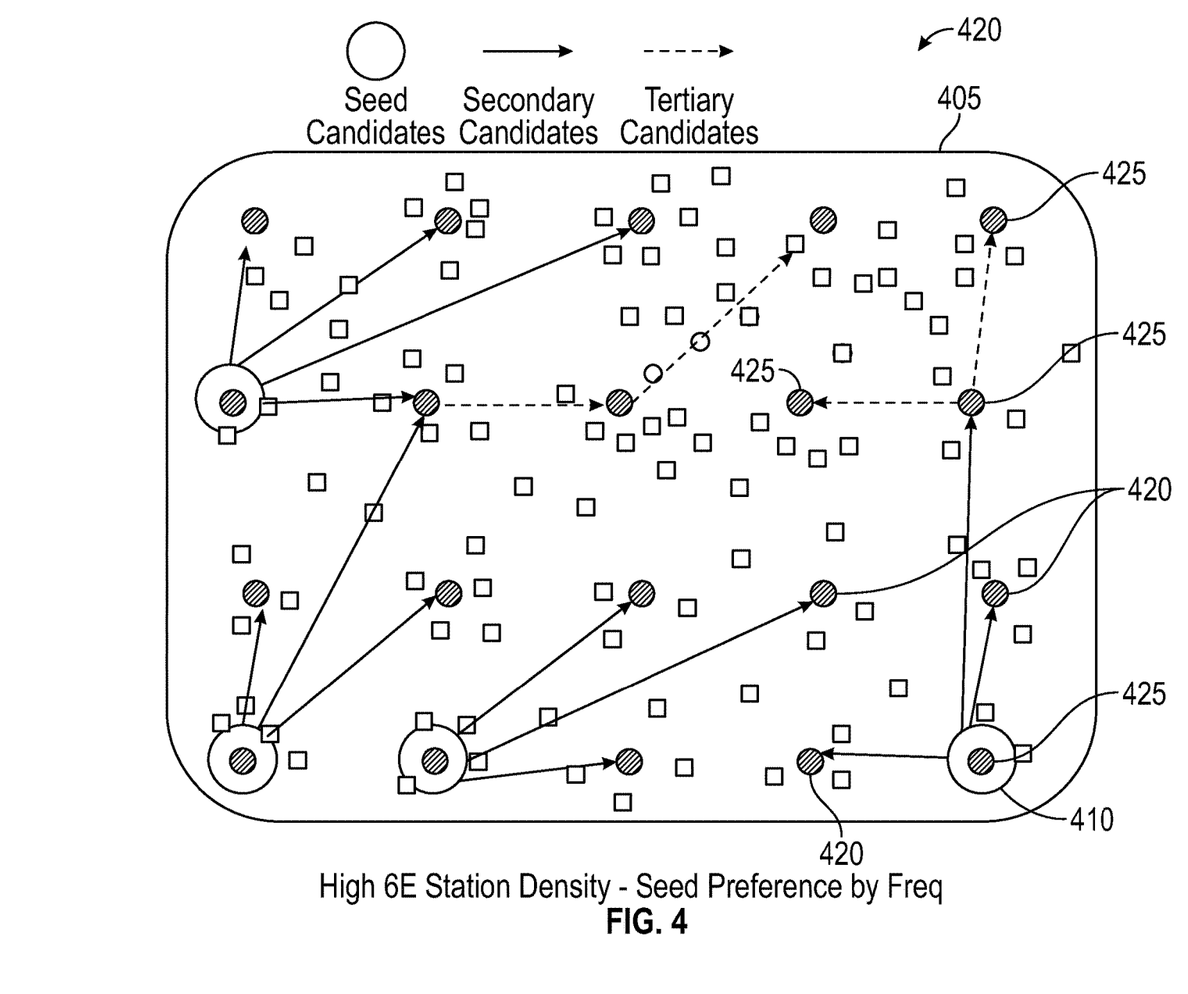
FIG. 4 illustrates a dense network.

FIG. 4 illustrates a dense network 405. If composite density score is high, i.e., above a determined level, candidate access points 410 having a minimal set of frequencies with a relatively higher power are selected as the seed access point 415. One or more candidate access points 410 can be selected as a seed access point 415. In the example illustrated in FIG. 4 all of the candidate access points 410 are selected to operate as seeds 415. Seed access points 415 are more susceptible to frequent power updates by the AFC system and channel assignment algorithm. The EiRP of access points 420 neighboring the seed access points 415 are then adjusted accordingly, typically the EiRP of the neighboring access points are lowered. The access points 420 neighboring a seed access point 415 can be linked directly to the seed access point 415. Any non-seed access point 425 that is not in the first hop vicinity of the seed access points 415 are tertiary candidates and are not directly linked to the seed access points 415. This process offers better channel reuse among the neighboring 6E access points and avoids frequent radio resource management (RRM) power configuration updates.

Figure 5:
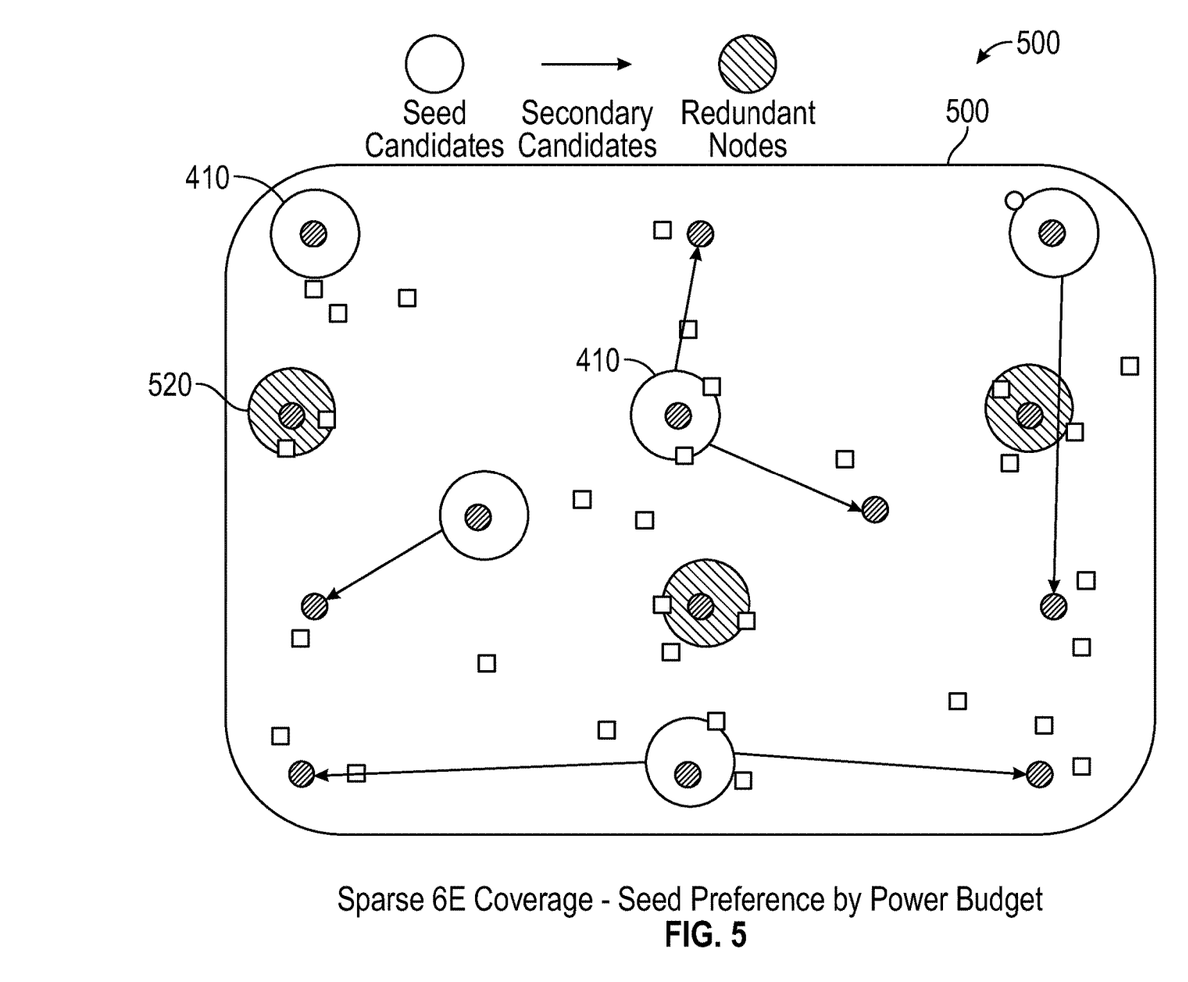
FIG. 5 illustrates a low-density network.
Figure 6:
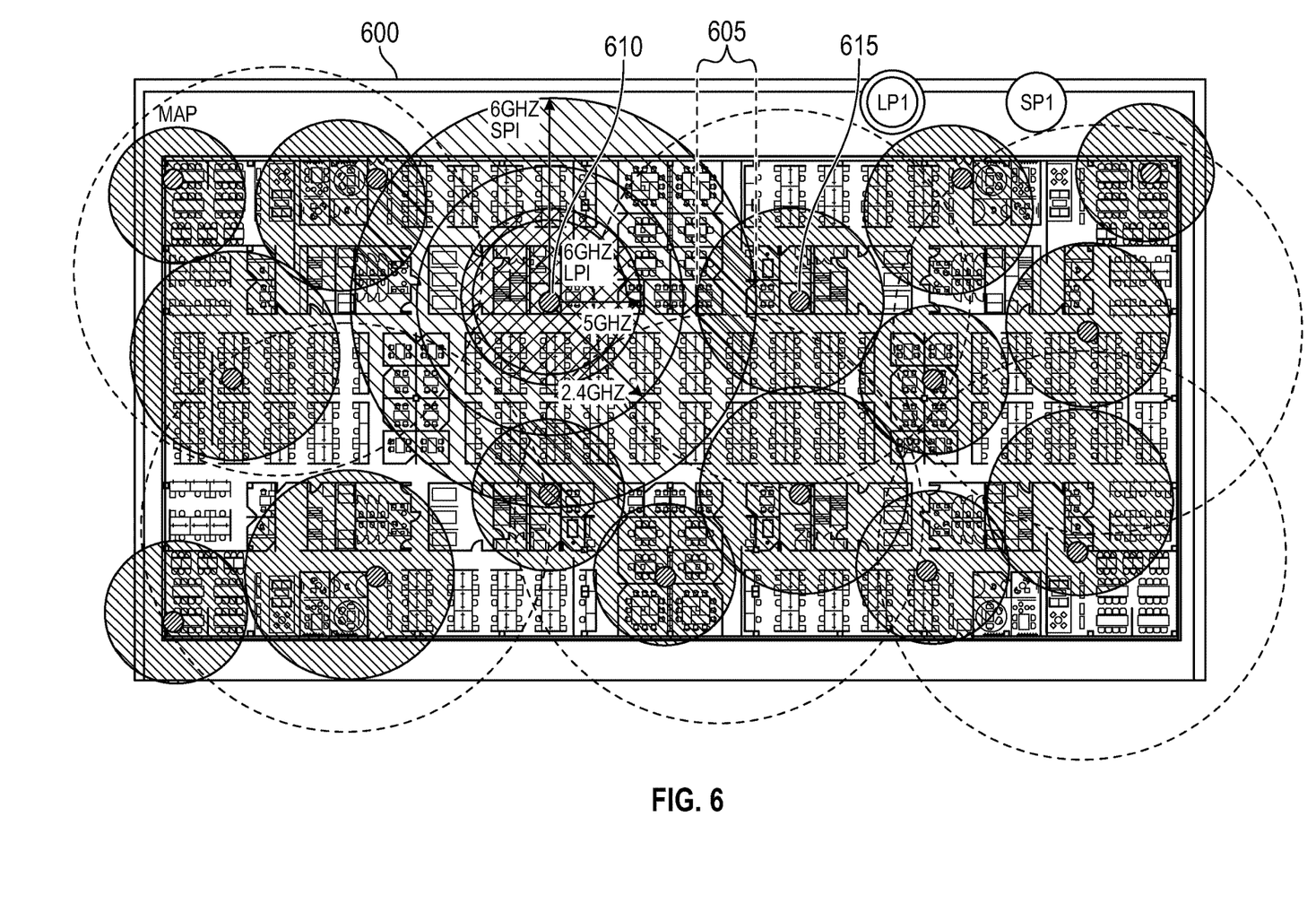
FIG. 6. illustrate low-density network.

FIG. 5 and FIG. 6. illustrate low-density networks 500 and 600, respectively. Referring to FIG. 5, if the composite density score is below a determined level, the network 500 is deemed to have a low density or be sparse. In a sparce network 500, access points 505 with a minimal allowed power budget will be chosen as the least preferred candidates. When neighboring 6E access points with a higher EiRP budget 510 can provide complete coverage 515, the access points 520 with a minimal set of allowed channels (purple circles) can be marked as redundant/non-operable. Station density around the redundant access points 520 is taken into consideration to avoid coverage holes in the network 500. Additionally, referring to FIG. 6, a coverage overlap factor (COF) is utilized for low density networks 600 to determine what percentage of cell coverage overlaps 605 between immediate neighbors, e.g., 610 and 615. Referring back to FIG. 5, immediate first hop neighbors of the seed candidates that aren't completely covered by them will be chosen as secondary candidate nodes. (green arrows) Coverage mode requires lower channel reuse and therefore could benefit from prioritizing SP radios over LPIs.

In another alternative embodiment, the power control method described herein analyzes the historical variability of the maximum EiRP variation for frequencies operating at the standard power. Candidate access points with the lower variance can be chosen as preferred candidate access points over candidate access points that have a higher EiRP variability due to dynamic incumbent operations.

The list of final candidate access points is generated and then submitted to the power control method as describe below.

A process of cognizant power control computes optimal power assignment for 6E access points once candidate access point selection is complete. This cognizant power control method offers closed loop calibration with the frequency and the bandwidth assignment methods. It measures coverage overlap between co-channel neighbors and radios with an overlapping coverage area.

Unlike its predecessors, 6 GHz radios support fixed power spectral density for LPI devices, which allows them to maintain a consistent signal-to-noise ratio over higher bandwidths. Therefore, frequency bandwidth adjustments may be considered prior to computing maximum a TPO/EiRP for 6E access points. In the first step of the cognizant power control process, candidate access points can be populated with their updated max power budget based on the frequency and bandwidth of operation. This process supports built-in calibration cycle post frequency and bandwidth optimization iterations.

In the second step of the power control method, the optimal transmit power of the candidate node may be calculated based on the presence of adjacent neighbors, the impact of CCI, the proximity of an access point with the nearest on-channel neighbors, and the cell overlap with immediate neighbors. Additionally, this method may utilize a spectrum reuse (SR) neighbor index. The SR Neighbor index may dynamically vary based on how much cell overlap is required between a candidate access point and its immediate neighbors.

When calculating the transmit power for a candidate access point the candidate access point's immediate co-channel neighbors that are heard within a determined RSSI boundary are considered in an effort to minimize inter-access point Wi-Fi interference amongst them. The neighbors are sorted by their bidirectional signal (i.e., the RSSI for the transmit and receive signals for a neighbor) from the candidate AP and then bucketized into RSSI beans. Neighbors with a stronger signal will have proportionally higher weights applied for each of the beans. The weighted mean of the candidate's neighbor RSSI is calculated according to Equation (1):

$$\text{weighted\_}\mu\text{\_obss\_neighbors} = (\alpha^* \text{mean\_rssi\_bucket1} + \beta^* \text{mean\_rssi\_bucket2} + \ldots + \gamma^* \text{mean\_rssi\_bucket2})/\text{num\_buckets} \quad (1)$$

Most 6 GHz access points have collocated radios operating in the 2.4 GHz and 5 GHz spectrums. As a result, the placement density for 6 GHz access points that support tri-bands may be similar to the deployment of traditional 5 GHz access points. This placement density for 6 GHz access points operating in tri-bands creates a problem for a 6E access point power control mechanism, at least because power adjustments using co-channel neighbors may lead to 6E radios operating at highest power and thus triggering issues like sticky clients and roaming delays in the network.

SR Neighbor Index based power optimization can be used to control the placement density of 6 GHz access points. Two factors primarily drive SR Index in a given localized RF neighborhood, the bandwidth availability factor (BAF) and the effective neighbor index (ENI).

The BAF is a parameter dictated by the total number of permitted 20 MHz channels and operational bandwidth of the candidate radio. For LPI radios by default all channels within a country will be part of the DAF. For SP/SPI radios, all channels with a reduced power budget offered by the AFC system will be omitted from the BAF. As shown in equations 2 and 3, when channel assignment is enforced around Preferred Scanning Channels (PSC), the bandwidth (BW) divisor is compensated accordingly to represent new permitted list.

$$\text{BAF} = \text{Permitted\_Chan\_Count} \times \text{BW Divisor} \quad (2)$$

$$\text{BW Divisor} = \text{If } \{\text{PSC\_Enforced \&\& if } \{\text{Oper\_BW} (20,40,80) = 1\}, \text{else } 0.5\}, \text{else if } \{\text{PSC } 1 = \text{Enforced then Oper\_BW}(20) = 1, \text{Oper\_BW} (40) = 0.5, \text{Oper\_BW}(80) = 0.25, \text{Oper\_BW}(160) = 0.125\} \quad (3)$$

The cell boundaries for a candidate access point may be normalized to the representative effective neighbor index in an effort to make the cell for the candidate access point have the right level of overlap when it is circumscribed to its non-OBSS neighbors that are in close proximity.

ENI is directly proportional to the inter-access point RF density between a 6E candidate radios and its immediate neighbors. When the ENI is at an optimal level, a majority of the candidate radios do not have more than theta (Θ) % bidirectional overlap. The power control method may determine a suitable theta based on the bidirectional overlap computed over their RF distances according to Equation (4):

$$\text{Optimal } \Theta = \{\text{Bidirectional\_Overlap}(c,x) \&\& \text{Bidirectional\_Overlap}(c,x) \&\& \text{Bidirectional\_Overlap}(c,x) \&\& \text{Bidirectional\_Overlap}(c,x)\} \quad (4)$$

The SR Neighbor index is then determined according to equation (5):

$$\text{SR Neighbor Index} = \text{BAF}(\text{Permitted\_Chan\_Count} \times \text{BW Divisor})/\text{ENI}(\Theta) \quad (5)$$

Figure 7A:
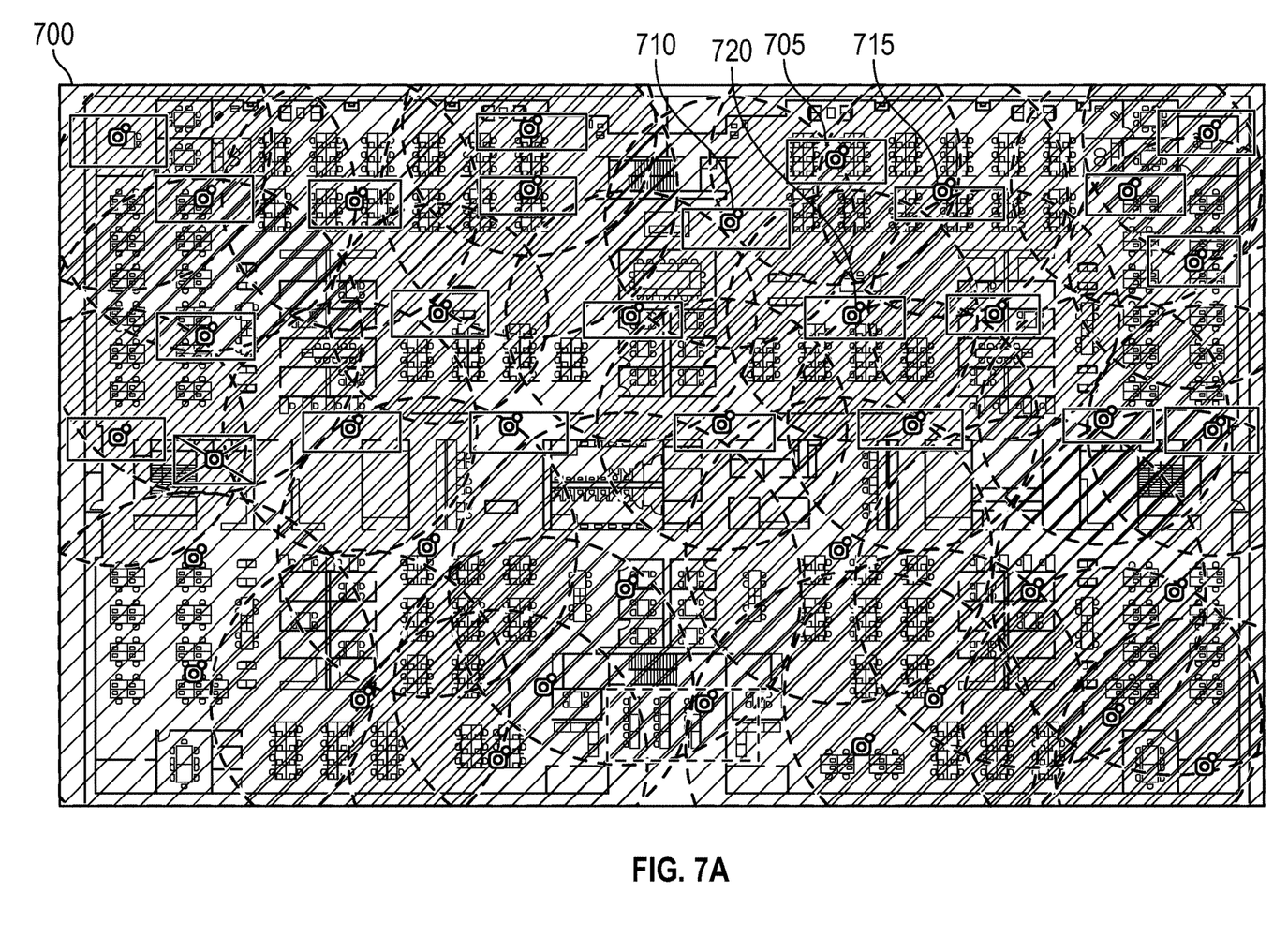
FIG. 7A shows the layout of a sample WiFi network 700*a*.
Figure 7B:
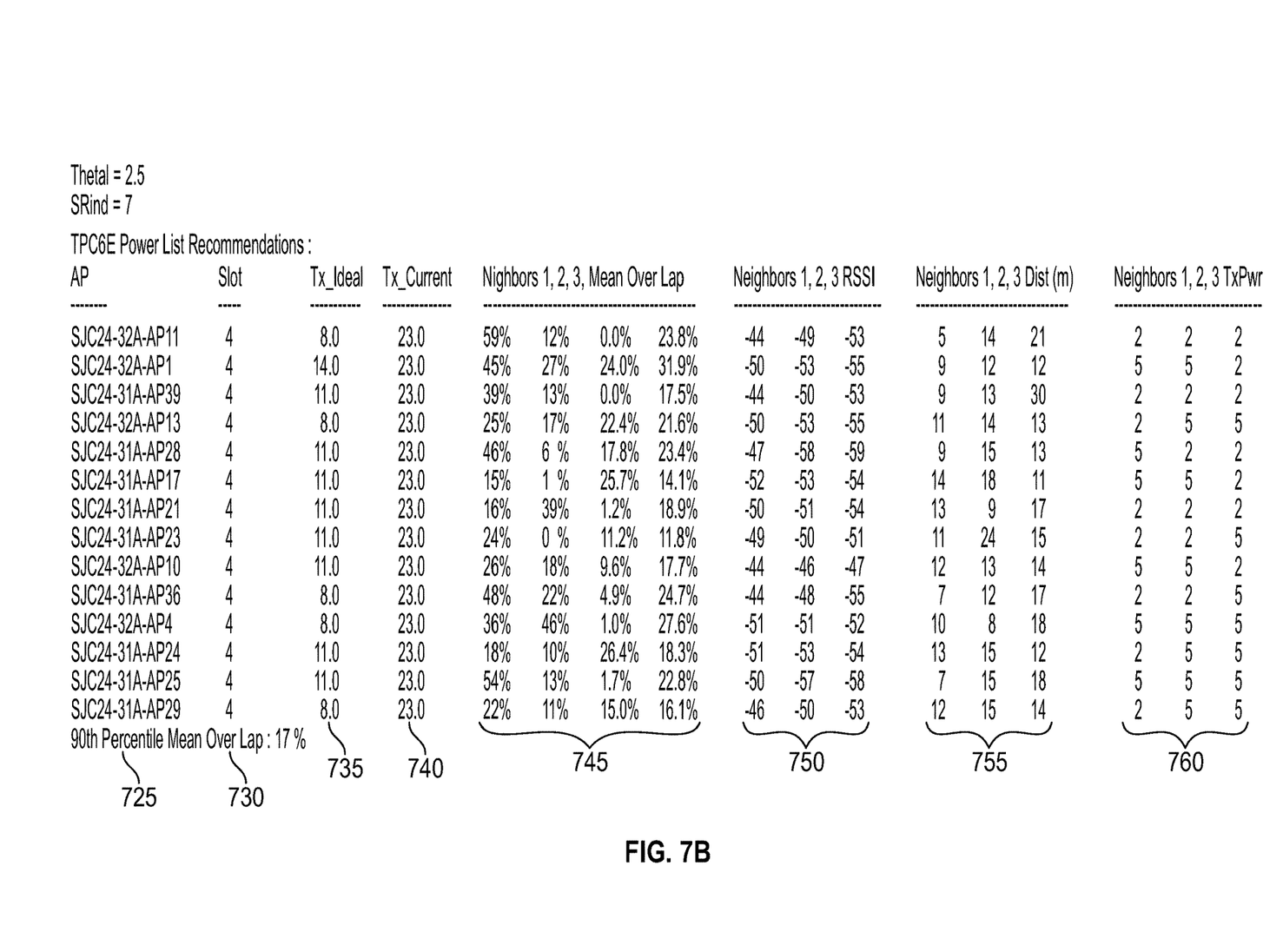
FIG. 7B is a chart 700*b* showing values defining the mean overlap between a seed access point and its three nearest neighbors.
Figure 7C:
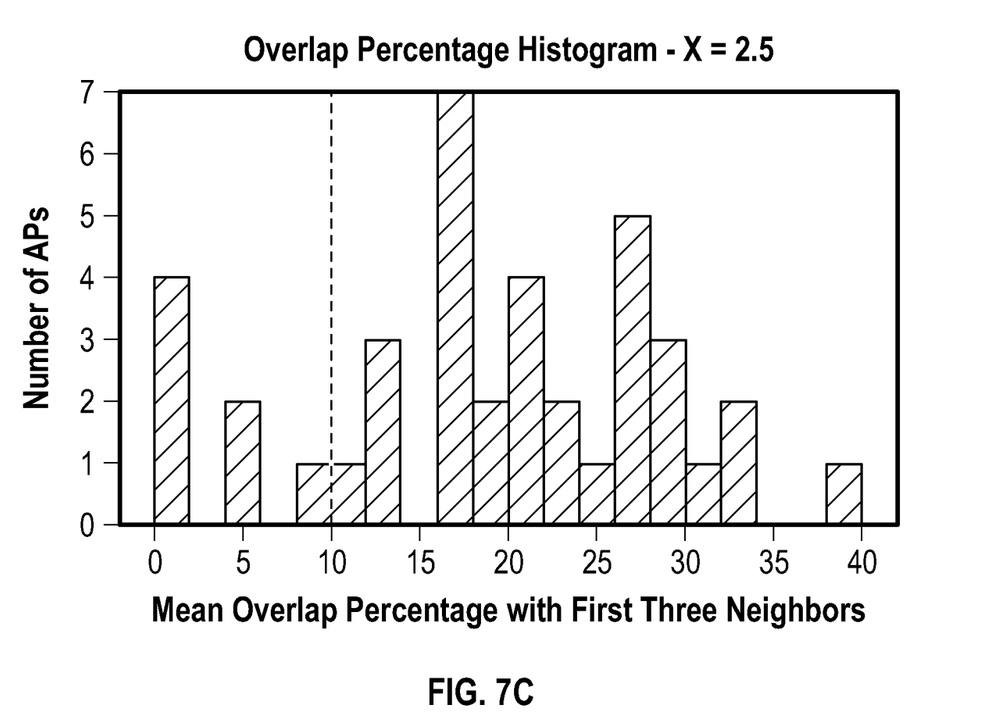
FIG. 7C is a histogram of the mean overlap between an access point and its three nearest neighbors

FIG. 7A shows the layout of a sample WiFi network 700. FIG. 7B is a chart showing values defining the mean overlap between a seed access point 705 in the network 700 and its three nearest neighbors 710, 715, 720 for a theta (of 2.5 and Srind of 7. The first column 725 identifies the access point, the second column 730 is the slot, which is in this example is slot 4. The third column 735 is the ideal transmit power. The fourth column 740 is the current transmit power. The fifth set of columns 745 is the percent coverage overlap between the access point and its three nearest neighbors and then the mean overlap between the access point and its three nearest neighbors. The sixth set of columns 750 is the RSSI for the access point's three nearest neighbors. The seventh set of columns 755 is the distance between the access point and its three nearest neighbors in meters. The eight set of columns 760 is the transmit power of each of the three nearest neighbors. FIG. 7C Is a bar chart representing a histogram of the mean overlap between the access point and its three nearest neighbors when theta (Θ) is 2.5.

In the third step, the transmit power of a candidate access point may be rolled back. After evaluation of the coverage between immediate and co-channel neighbors, the co-channel contention impact on the neighboring access points is assessed. If a bandwidth induced EiRP increase would result in higher CCI on nearby same channel access points, a self-activating power rollback is triggered to minimize its impact on the co-channel neighbors.

In the fourth step, the optimal transmit power is calculated. Step 4 Compute Optimal TxPower: Using the factors discussed herein, the transmit power for a candidate access point is computed as Tx Ideal using the first normalized Tx over the access point's operational bandwidth and then the weighted sum of pi mean OBSS weighted_u_obss_neighbors. The SR neighbor index is utilized to further compensate the transmit power based on adjacent neighbor density around the candidate access point. Accordingly, the optimal transmit power is computer according to equation (6):

$$\text{TxPower} = \text{Freq\_BW}(\text{Tx}) - [\text{Pc Thresh} - \{W\Sigma\text{OBSS} \mu + W \text{ SR}\}] \quad (6)$$

In the firth step of the power control method, steps 1 through 4 are repeated for all eligible candidate radios. The process can end when these steps are completed for each of the candidate access points.

In alternative embodiment, the power control method described herein may use historical Max EIRP constraints to notify the bandwidth allocation method. In this embodiment, it assumed that majority of the incumbents are pseudo static and hence variability in EiRP budget can dictate an upper bound of its operational bandwidth.

Figure 8:
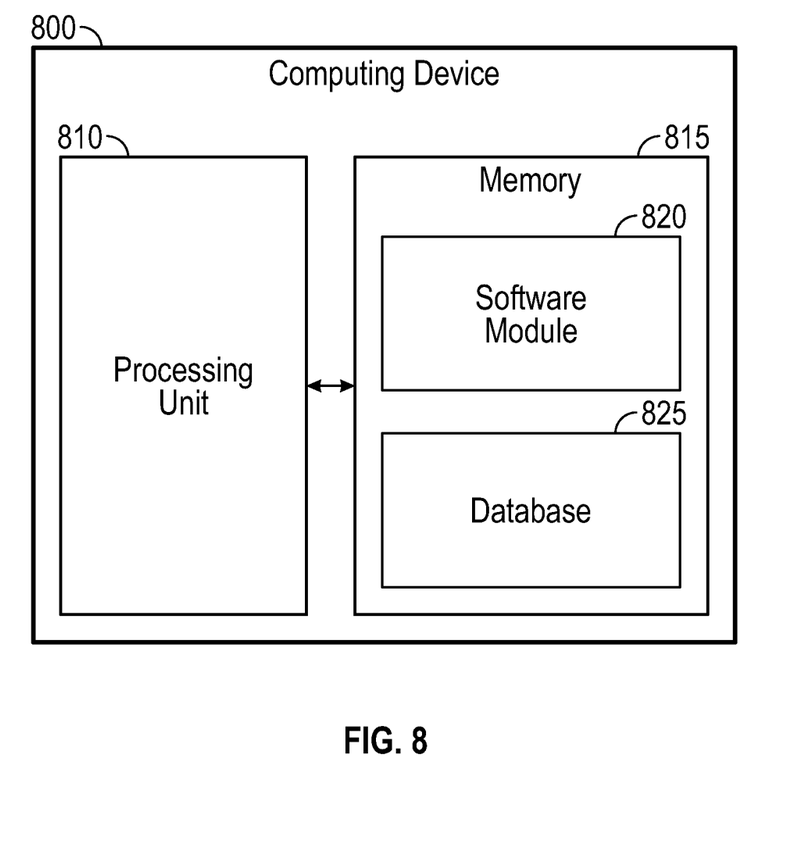
FIG. 8 is a block diagram of a computing device.

FIG. 8 shows computing device 800. As shown in FIG. 8, computing device 800 may include a processing unit 810 and a memory unit 815. Memory unit 815 may include a software module 820 and a database 825. While executing on processing unit 810, software module 820 may perform, for example, processes as describe with reference to FIG. 2. Computing device 800, for example, may provide an operating environment for controller 105, CNC server 120, CUC, 125 server, first AP 135, second AP 140, first client device 145, second client device 150, and third client device 155. Controller 105, CNC server 120, CUC, 125 server, first AP 135, second AP 140, first client device 145, second client device 150, and third client device 155 may operate in other environments and are not limited to computing device 400.

Computing device 800 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The methods, systems, computer-readable medium disclosed herein have many aspects including the following.

One aspect is a system comprising a memory storage and a processing unit. The processing unit disposed in a station and in data communication with the memory storage, the station in a network of access points the processing unit operative to determine access points operating in a low power indoor (LPI) mode and access points operating in a standard power (SP or SPI) mode; sort the access points operating in an SP or SPI mode by available frequencies and maximum power budget, and for each access point in the network, determine a composite radio frequency (RF) density score, wherein higher density scores correspond to a denser population of access points in the network; if the composite RF density score is above a determined level, designate an access point that supports frequencies below a threshold level and that have an effective isotropic radiated power (EiRP) above a determined level as a seed candidate; and designate at least one of the seed candidates as a seed access point.

Another aspect is a system, alone or in any combination with the previous embodiments and aspects disclosed herein, wherein the processor is operative to determine a percentage of coverage overlap between a seed access point and its neighbors using a coverage overlap factor (COF); and designate neighbor seed access point as a secondary access point when the seed access point overlaps the neighbor seed access point by less than 100%.

Another aspect is a system, alone or in any combination with the previous embodiments and aspects disclosed herein, wherein the processor is operative to adjust a power output of the secondary access points.

Another aspect is a system, alone or in any combination with the previous embodiments and aspects disclosed herein, wherein an access point that is not a seed access point or a secondary access point is designated as tertiary access points.

Another aspect is a system, alone or in any combination with the previous embodiments and aspects disclosed herein, wherein the processor is operative to designate a non-seed access points as either redundant or nonoperative if the composite RF density score for the non-seed access point is below a determined amount and an access point neighboring the non-seed access point provides complete RF coverage for the non-seed access point.

Another aspect is a system, alone or in any combination with the previous embodiments and aspects disclosed herein, wherein the available frequencies are determined by an automated frequency coordinator (AFC).

Another aspect is a system, alone or in any combination with the previous embodiments and aspects disclosed herein, wherein the processor is operative to sort the access points operating at the SP more or the SPI mode by available frequency in an ascending order; and sort the access points operating as the SP mode or the SPI mode by a maximum power budget in a descending order.

Another aspect is a method, alone or in any combination with the previous embodiments and aspects disclosed herein, wherein the method comprises identifying access points operating in a low power indoor (LPI) mode and access points operating in a standard power (SP or SPI) mode; sorting the access points operating in an SP or SPI mode by available frequencies and maximum power budget, and for each access point in the network, determining a composite radio frequency (RF) density score, wherein higher density scores correspond to a denser population of access points in the network; if the composite RF density score is above a determined level, designating the access point that supports frequencies below a threshold level and that have an effective isotropic radiated power (EiRP) above a determined level as a seed candidate; and designating at least one of the seed candidates as a seed access point.

Another aspect is a method, alone or in any combination with the previous embodiments and aspects disclosed herein, wherein the method comprising determining a percentage of coverage overlap between a seed access point and its neighbors using a coverage overlap factor (COF); and designating a neighbor seed access point as a secondary access point when the seed access point overlaps the neighbor seed access point by less than 100%.

Another aspect is a method, alone or in any combination with the previous embodiments and aspects disclosed herein, wherein the method comprise adjusting a power output of the secondary access points.

Another aspect is a method, alone or in any combination with the previous embodiments and aspects disclosed herein, wherein the method comprises designating an access point that is not a seed access point or a secondary access point as tertiary access points.

Another aspect is a method, alone or in any combination with the previous embodiments and aspects disclosed herein, wherein the method comprises designating a non-seed access points as either redundant or nonoperative if the composite RF density score for the non-seed access point is below a determined amount and an access point neighboring the non-seed access point provides complete RF coverage for the non-seed access point.

Another aspect is a method, alone or in any combination with the previous embodiments and aspects disclosed herein, wherein the method comprises determining available frequencies by an automated frequency coordinator (AFC).

Another aspect is a method, alone or in any combination with the previous embodiments and aspects disclosed herein, wherein the method comprises sorting the access points operating at the SP more or the SPI mode by available frequency in an ascending order; and sorting the access points operating as the SP mode or the SPI mode by a maximum power budget in a descending order.

Another aspect is a computer-readable medium that stores a set of intransient instructions, alone or in any combination with the previous embodiments and aspects disclosed herein, wherein the computer-readable medium stores a set of instructions which when executed perform a method executed by the set of instructions comprising identifying access points operating in a low power indoor (LPI) mode and access points operating in a standard power (SP or SPI) mode; sorting the access points operating in an SP or SPI mode by available frequencies and maximum power budget, and for each access point in the network, determining a composite radio frequency (RF) density score, wherein higher density scores correspond to a denser population of access points in the network; if the composite RF density score is above a determined level, designating the access point that supports frequencies below a threshold level and that have an effective isotropic radiated power (EiRP) above a determined level as a seed candidate; and designating at least one of the seed candidates as a seed access point.

Another aspect is a computer-readable medium that stores a set of intransient instructions, alone or in any combination with the previous embodiments and aspects disclosed herein, wherein the computer-readable medium stores a set of instructions which when executed perform a method executed by the set of instructions comprising determining a percentage of coverage overlap between a seed access point and its neighbors using a coverage overlap factor (COF); and designating a neighbor seed access point as a secondary access point when the seed access point overlaps the neighbor seed access point by less than 100%.

Another aspect is a computer-readable medium that stores a set of intransient instructions, alone or in any combination with the previous embodiments and aspects disclosed herein, wherein the computer-readable medium stores a set of instructions which when executed perform a method executed by the set of instructions comprising adjusting a power output of the secondary access points.

Another aspect is a computer-readable medium that stores a set of intransient instructions, alone or in any combination with the previous embodiments and aspects disclosed herein, wherein the computer-readable medium stores a set of instructions which when executed perform a method executed by the set of instructions comprising designating an access point that is not a seed access point or a secondary access point as tertiary access points.

Another aspect is a computer-readable medium that stores a set of intransient instructions, alone or in any combination with the previous embodiments and aspects disclosed herein, wherein the computer-readable medium stores a set of instructions which when executed perform a method executed by the set of instructions comprising designating a non-seed access points as either redundant or nonoperative if the composite RF density score for the non-seed access point is below a determined amount and an access point neighboring the non-seed access point provides complete RF coverage for the non-seed access point.

Another aspect is a computer-readable medium that stores a set of intransient instructions, alone or in any combination with the previous embodiments and aspects disclosed herein, wherein the computer-readable medium stores a set of instructions which when executed perform a method executed by the set of instructions comprising determining available frequencies by an automated frequency coordinator (AFC).

Another aspect is a computer-readable medium that stores a set of intransient instructions, alone or in any combination with the previous embodiments and aspects disclosed herein, wherein the computer-readable medium stores a set of instructions which when executed perform a method executed by the set of instructions comprising sorting the access points operating at the SP more or the SPI mode by available frequency in an ascending order; and sorting the access points operating as the SP mode or the SPI mode by a maximum power budget in a descending order.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A system comprising:
   a memory storage; and
   a processing unit, the processing unit disposed in a station and in data communication with the memory storage, the station in a network of access points the processing unit operative to:
      determine access points operating in a low power indoor (LPI) mode and access points operating in a standard power (SP or SPI) mode;
      for each access point in the network, determine a composite radio frequency (RF) density score, wherein higher density scores correspond to a denser population of access points in the network;
      if the composite RF density score is above a determined level, designate an access point that supports frequencies below a threshold level and that have an effective isotropic radiated power (EiRP) above a determined level as a seed candidate; and
      designate at least one of the seed candidates as a seed access point.

2. The system of claim 1 wherein the processing unit is further operative to:
   determine a percentage of coverage overlap between a seed access point and its neighbors using a coverage overlap factor (COF); and
   designate neighbor seed access point as a secondary access point when the seed access point overlaps the neighbor seed access point by less than 100%.

3. The system of claim 2 wherein the processing unit is further operative to adjust a power output of the secondary access points.

4. The system of claim 2 wherein an access point that is not a seed access point or a secondary access point is designated as tertiary access points.

5. The system of claim 4 wherein the processing unit is further operative to:
   designate a non-seed access points as either redundant or nonoperative if the composite RF density score for the non-seed access point is below a determined amount and an access point neighboring the non-seed access point provides complete RF coverage for the non-seed access point.

6. The system of claim 1 wherein the available frequencies are determined by an automated frequency coordinator (AFC).

7. The system of claim 1 wherein processing unit is further operative to:
   sort the access points operating at the SP mode more or the SPI mode by available frequency in an ascending order; and
   sort the access points operating as the SP mode or the SPI mode by a maximum power budget in a descending order.

8. A method comprising:
   identifying access points operating in a low power indoor (LPI) mode and access points operating in a standard power (SP or SPI) mode;
   for each access point in a network, determining a composite radio frequency (RF) density score, wherein higher density scores correspond to a denser population of access points in the network;
   if the composite RF density score is above a determined level, designating the access point that supports frequencies below a threshold level and that have an effective isotropic radiated power (EiRP) above a determined level as a seed candidate; and
   designating at least one of the seed candidates as a seed access point.

9. The method of claim 8 further comprising:
   determining a percentage of coverage overlap between a seed access point and its neighbors using a coverage overlap factor (COF); and
   designating a neighbor seed access point as a secondary access point when the seed access point overlaps the neighbor seed access point by less than 100%.

10. The method of claim 9 further comprising adjusting a power output of the secondary access points.

11. The method of claim 9 further comprising designating an access point that is not a seed access point or a secondary access point as tertiary access points.

12. The method of claim 11 further comprising:
    designating a non-seed access points as either redundant or nonoperative if the composite RF density score for the non-seed access point is below a determined amount and an access point neighboring the non-seed access point provides complete RF coverage for the non-seed access point.

13. The method of claim 8 further comprising determining available frequencies by an automated frequency coordinator (AFC).

14. The method of claim 8 further comprising:
    sorting the access points operating at the SP mode or the SPI mode by available frequency in an ascending order; and
    sorting the access points operating as the SP mode or the SPI mode by a maximum power budget in a descending order.

15. A non-transitory computer-readable medium that stores a set of instructions which when executed perform a method executed by the set of instructions comprising:

identifying access points operating in a low power indoor (LPI) mode and access points operating in a standard power (SP or SPI) mode;

for each access point in a network, determining a composite radio frequency (RF) density score, wherein higher density scores correspond to a denser population of access points in the network;

if the composite RF density score is above a determined level, designating the access point that supports frequencies below a threshold level and that have an effective isotropic radiated power (EiRP) above a determined level as a seed candidate; and designating at least one of the seed candidates as a seed access point.

16. The non-transitory computer-readable medium of claim 15 further comprising:

determining a percentage of coverage overlap between a seed access point and its neighbors using a coverage overlap factor (COF); and designating a neighbor seed access point as a secondary access point when the seed access point overlaps the neighbor seed access point by less than 100%.

17. The non-transitory computer-readable medium of claim 16 further comprising adjusting a power output of the secondary access points.

18. The non-transitory computer-readable medium of claim 17 further comprising designating an access point that is not a seed access point or a secondary access point as tertiary access points.

19. The non-transitory computer-readable medium of claim 18 further comprising:

designating a non-seed access points as either redundant or nonoperative if the composite RF density score for the non-seed access point is below a determined amount and an access point neighboring the non-seed access point provides complete RF coverage for the non-seed access point.

20. The non-transitory computer-readable medium of claim 15 further comprising determining available frequencies by an automated frequency coordinator (AFC).

* * * * *